United States Patent [19]

Flynn

[11] Patent Number: 4,714,188

[45] Date of Patent: Dec. 22, 1987

[54] METHOD OF MAKING METAL SCULPTURES

[76] Inventor: Kenneth C. Flynn, Forest Woods Ct., Rte. 3, Box 139A, Hedgesville, W. Va. 25427

[21] Appl. No.: 920,406

[22] Filed: Oct. 20, 1986

[51] Int. Cl.[4] .............................................. B23K 31/00
[52] U.S. Cl. .................................... 228/120; 228/159; 29/423
[58] Field of Search ............... 228/120, 178, 163, 159; 29/160.6, 423; 164/246, 34, 112

[56] References Cited

U.S. PATENT DOCUMENTS

| | | | |
|---|---|---|---|
| 970,096 | 9/1910 | McPhillips | 164/112 |
| 1,072,026 | 9/1913 | Morris | 164/112 |
| 1,722,281 | 7/1929 | During | 164/112 |
| 2,504,823 | 4/1950 | George | 164/112 |
| 3,457,625 | 7/1969 | Wanamaker | 156/ |
| 3,854,195 | 12/1974 | Landig | 164/34 |

FOREIGN PATENT DOCUMENTS

| | | | |
|---|---|---|---|
| 2123632 | 8/1972 | Fed. Rep. of Germany | 164/34 |
| 52561 | 3/1982 | Japan | 164/112 |
| 604599 | 9/1978 | Switzerland | 29/160.6 |
| 2047141 | 11/1980 | United Kingdom | 164/34 |

Primary Examiner—Nicholas P. Godici
Assistant Examiner—Samuel M. Heinrich
Attorney, Agent, or Firm—Sperry, Zoda & Kane

[57] ABSTRACT

A method of sculpting in metal is disclosed in which the artist first sculpts or otherwise forms a core in a desired, artistic, aesthetically pleasing shape. The core is formed of a material which is at least meltable, and in most instances capable of being completely destroyed, as for example by being burned. In carrying out the process, the artist applies pin-like elements to the entire surface of the core, having large flattened heads flush with the core surface and at some locations, from one another. Thereafter, a brazing rod is applied to the heads of the nails, using conventional welding methods, forming a metallic sheath that follows the surface of the sculptured core and which is formed throughout with irregularly shaped openings occurring between the heads of the pin elements. The core is then burned out or otherwise destroyed without affecting the metallic sheath, leaving the hollow metallic sheath as the end sculpture.

18 Claims, 7 Drawing Figures

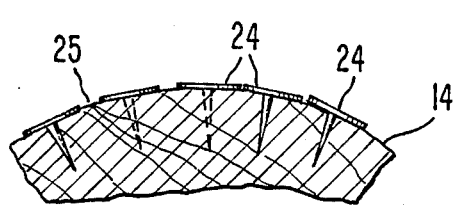
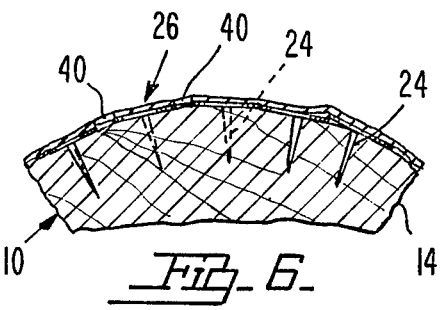
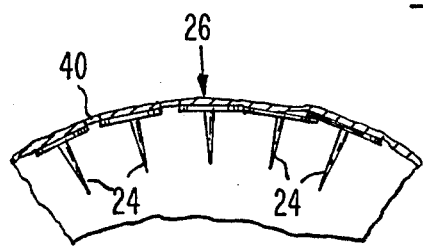

METHOD OF MAKING METAL SCULPTURES

BACKGROUND OF THE INVENTION

1. Field of the Invention

The present invention relates generally to the field of providing three dimensional, artistic forms, and in particular, to a method of making metallic sculptures.

2. Description of the Prior Art

Sculpting methods have been proposed, including means for sculpting in metal. It has been suggested that a hollow metallic sculpture might be made by first providing a destructible core as a base or foundation about which to form a metallic, hollow sculpture faithfully following the lines or contours of the core, and thereafter burning out or otherwise destroying the core to leave only the hollow metallic sculpture. This arrangement has desirable features over anything known in the prior art, in that it offers a highly effective means for forming hollow metallic sculptures, which heretofore have been very difficult to form to desired, aesthetically pleasing shapes.

Further, in accordance with the invention as distinguished from the prior art, it is proposed to form a metallic sheath about a destructible core in such a way that the sheath has apertures that permit special lighting effects to be achieved after the core has been destroyed, in that light may come, for example, from within the sculpture, utilizing either natural or artifical light as desired for this purpose.

SUMMARY OF THE INVENTION

The invention comprises a method of making a metallic sculpture that first involves the preparation of a core formed wholly from a material that is capable of being melted, burned, or otherwise quickly removed from the finished metal sculpture.

The invention includes driving a quantity of spaced roofing nails or similar headed pin elements into the surface of the core, leaving the heads of the elements spaced in relation to one another. Brazing rod material or the like is then applied to the heads of the elements, by basically conventional welding or brazing methods, to bond a metal, sheet-like form to the heads, in closely spaced relation to but closely following the form of the core itself. This produces a metallic sculpture in the artistic form in which the core itself was sculpted. The core is now removed, by being burned, melted, or otherwise completely destroyed or changed in form, so as to flow out of the metallic sculpture either in gaseous or liquid form, leaving only the metallic sculpture having the same artistic form as the core about which the metallic sheath was formed.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 5 is a greatly enlarged, fragmentary, detail sectional view taken substantially on line 5—5, illustrating the manner of applying the headed elements to the core;

FIG. 6 is a view similar to FIG. 5, taken substantially on line 6—6 of FIG. 3, in which the metallic sheath has been brazed to the heads of the pin-like elements; and FIG. 7 is a view similar to FIGS. 5 and 6, taken substantially on line 7—7 of FIG. 4, the core having been removed to leave the completed metallic sculpture.

DESCRIPTION OF THE PREFERRED EMBODIMENT

Figure 1:
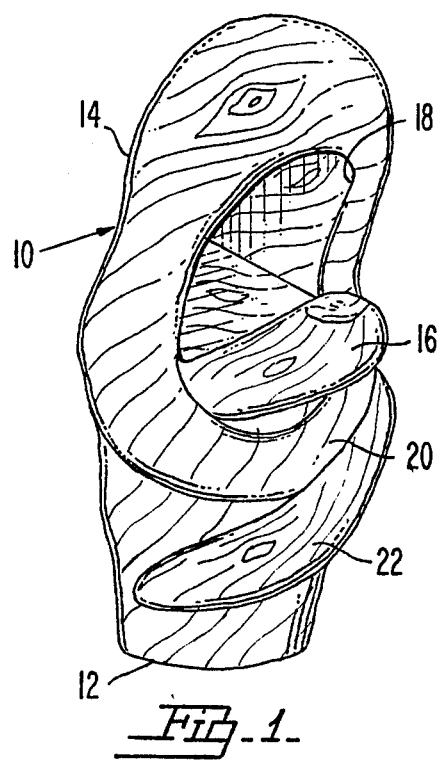
FIG. 1 is a perspective view illustrating a typical, sculpted wooden core as it appears upon completion of the first step of the inventive process.

Referring to the drawing in detail, the inventive process includes, in every instance, the initial provision of a core generally designated 10 in the several figures of the drawing. The core is formed to any desired artistic shape, the exterior configuration of which is consistent with the application of a metallic sheath thereto in the manner called for by further steps of the inventive process. In the illustrated example, and referring particularly to FIG. 1, it will be seen that the core illustrated by way of example is a sculpture wholly of wooden material, of a mother and child, in which the artist has departed from a completely realistic representation to convey to the viewer a softened and to some extent an abstract impression of the sculpted figures.

In this connection, it is immaterial what the subject of the sculpture is, and it is mainly important to note, for the purpose of the present application, that the core must be formed of a material that can be formed to a desired artistic shape, and that in a further step of the process can be completely destroyed, melted, or otherwise caused to be liquefied or changed to a gaseous and/or ash form in a manner effective to completely remove the same from a finished metallic sculpture.

In the present instance a wooden block has been chosen, of sufficient size to carve the intended sculpture. If a single block is unavailable, or is too unwieldy, then a lamination of several suitable pieces may be required. In certain instances, indeed, it is possible to utilize a plurality of blocks of sculpted wood, and assemble or unite them only during the further step of welding or brazing the metallic sheath.

If, as in the present instance, a single wooden block has been utilized to form the sculpted core, it must be carved to the shape intended for the finished metallic sculpture. Carving may utilize various known methods of sculpting in wood (e.g., saws, hatchets, chisels). The final core sculpture may be ground, sanded, and polished, and should be able to stand as a finished piece of sculpture on its own merit.

In the illustrated example, the sculpted core 10 is formed with a base 12, a hooded head portion 14, the somewhat abstract simulation of an infant 16, a deep opening 18, and arms 20, 22 in embracing relation to the infant simulation 16.

As a second step of my process, I drive a large quantity of headed, pin-like elements 24 into the exterior surface of core 10. I have found, for this purpose, that common roofing nails, which have large, flat heads and relatively short shanks, can be used effectively. Roofing nails such as those illustrated in the several figures of the drawing at 24, typically have a covering to prevent rusting. This covering, when subjected to brazing or welding temperatures, may cause toxic vapors, and accordingly it is desirable that a roofing nail be selected that will produce the least harmful vapor. Roofing nails that are electroplated are desirable over other types having heavier rust preventive coatings.

Nails 24 are driven fully into the surface of the core 10 as shown in FIG. 5. They are spaced closely over the entire exterior surface of the core 10.

The driving of nails tends to expand areas of the wooden core, as the nail shafts pass between the fibers of the wood. This expansion tends to destroy the sculpted core, and care must be taken during this step of the process to prevent this from happening. It has been found that a few nails should be driven at a time. Then, the sculptor "listens" to the wood core. Cracking or creaking sounds are certain indicators that expansion has occurred and that temporarily, it is desirable to halt further driving of the nails for a short time.

In this connection, although it has been indicated above that spacing of the heads of the nails from one another is desirable, this cannot be taken to mean that each and every nail must be clearly and distinctly spaced from all nails adjacent thereto. Rather, some nail heads must slightly overlap adjoining nail heads to facilitate bonding with molten metal during the brazing step to be described hereinafter. At the same time, however, other nail heads should be spaced apart, to provide spaces at discrete intervals over the entire array of nail heads, to cause the surface of the completed metallic sculpture to have a filigree appearance. Additionally, the provision of openings and the brazed surface of the metallic covering controls combustion, again in a manner to be described hereinafter.

It is therefore accurate to say that some of the nail heads are disposed, preferably, in overlapping relation, while others are spaced apart, so that when all the nails are driven into the core, openings of irregular shape or size appear over the entire surface, each bounded by nail heads that are disposed in an overlapping relationship.

Figure 2:
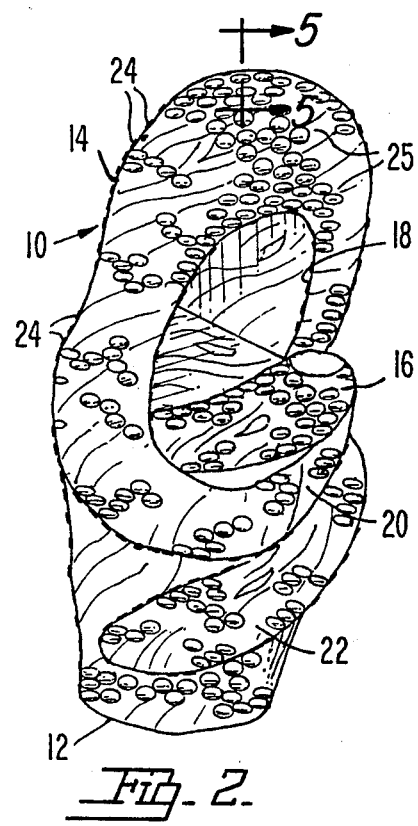
FIG. 2 is a similar perspective view of the core, in which the second basic step of making a metallic sculpture has been partially carried out, namely, the driving of a quantity of headed, pin-like elements into the surface of the core.

These openings occurring during the step of driving the nails have been illustrated in FIG. 2 at 25. In FIG. 2, it may be noted, the nails are shown driven into the core only over part of the area of the entire core, and as will be noted, it may also be advisable to initially space some of the nails apart, and then continue driving nails into the spaces intervening between those previously driven, to relieve strains and stresses on the wood fibers, and also to ultimately create nail covered areas in which the nails are concentrated more and more until ultimately most of the nail heads overlap, with, however, openings 25 occurring between the overlapped heads over the entire surface area.

The next step of the process is to create a metal sheath generally designated 26, covering the surface of the core. In the creation of the sheath or metal covering 26, brazing rod, of any common mixture of brass or other materials, is quite suitable. Once a rod containing a particular mixture of metals has been selected, it is advisable to retain the same mixture throughout the whole procedure, in order to have a consistent surface appearance. The brazing rod is applied to the heads of the nails, using conventional oxygen and acetylene welding methods.

A flux should be used when brazing. Paste flux is undesirable, since it leaves a crystalline coating on the brazed surface and is difficult to remove. Best results are obtained, utilizing a gas fluxing agent, dispensed with the oxygen and acetylene during the brazing process. Flux residue is thus essentially eliminated, making the final cleanup and polishing much speedier and more presentable.

Figure 3:
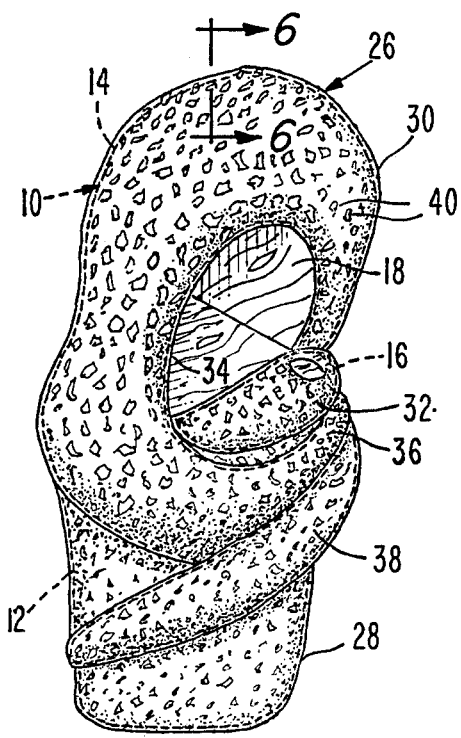
FIG. 3 is a perspective view illustrating the core covered by a sheath of metal applied by brazing metallic material to the heads of the elements illustrated in FIG. 2.
Figure 4:
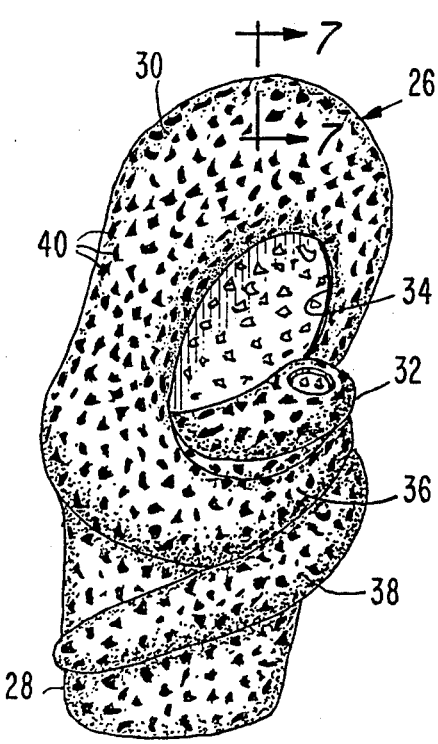
FIG. 4 is a perspective view illustrating the completed metallic sculpture, following removal of the core.

This step is continued until essentially the entire surface of the sculpted core 10 has been covered, in the manner shown in FIG. 3. It may be noted that during this process, a small portion of the surface of the core tends to burn away. This is desirable, in that it stress-relieves the core so that more nails can be inserted, at such locations as may be found desirable. In other words, it may even be desirable to apply only a quantity of the nails to the core prior to brazing. Then, during the brazing step, brazing can be halted at intervals while other nails are applied to insure against cracking of the core material. Nail insertion, thus, though begun prior to the first application of the brazing rod, can alternate with brazing until the entire metallic sheath 26 has been completed.

During the brazing process, normally interrupted as discussed above by the selected insertion of additional nails, the metallic sheath takes the form of the core. The sheath thus in the illustrated example includes a base 28, a head 30, a simulation of the infant 32, the face opening 34, and arms 36, 38 holding the infant 32. And, importantly, apertures 40 of irregular shape and size, occur at relatively closely spaced intervals over the entire surface of the metallic sheath, at the locations of the openings 25 that were left between the driven nails.

The provision of apertures 40 is for two primary reasons, one of which is aesthetic, in that the finished product will allow light to come from within the sculpture, thus enhancing the appearance thereof; and the other being that the burn out process requires oxygen and flue openings to promote combustion.

Ultimately, when the brazing step has been completed, the step of removing the core from within the sheath begins. This step is begun, when a wooden core is used as in the illustrated example, by using a flaming oxygen and acetylene torch, without the gas fluxing agent, as in any welding technique. Once the burning process begins, care must be taken not to raise the temperature of the brazed, sculpted surface of the sheath 26. To do so would tend to cause collapse of the entire structure.

A preferred method of burning out the core thus involves starting propagation of the flame upon the wooden core with the ignited torch. Then, the torch is extinguished and an oxygen "lance" is used to allow the burning to continue only very slowly, and under the sculptor's complete control. Because of the limited total area of the apertures 40, sufficient oxygen from the ambient atmosphere is unavailable to allow uncontrolled, continuing combustion. Correctly executed, the burn out process resembles the well charred log of a fireplace fire, that is, it has the appearance, when a wooden core is used, of embers glowing at several locations. The oxygen lance is used to keep this process alive.

It can be seen that the burn out process is critical, and it has been found desirable that it not be hurried, since it is a labor-intensive step during which great patience must be exercised.

When the final burn out process has been completed to the artist's satisfaction, the residual charcoal left within the sheath can be removed with a blast from an air hose. As much of this residue should be removed as possible.

In a preferred embodiment, a final step would be to polish the sheath, although most assuredly, this is within the preference of the artist. In some instances, the artist may be sculpting a particular subject in which the artist for aesthetic reasons may deliberately leave the surface of the sheath in an unpolished condition. This will usually not be the case, however, and if polishing is desired to enhance the appearance of the completed metallic sculpture, it is best done by using such procedures as glass bead blasting with high pressure air in a close chamber. Should the artist desire a softer exterior appearance, then blasting grits or abrasive media of various types may be used such as cracked nutshells, sand, etc.

Additionally, the polishing process may use wire brush methods, or if a highly polished surface is desired, then the surface can be sprayed or coated with a clear, protective lacquer or the like. Rust inhibiting clear sprays do well as a coating and also serve to inhibit rust or other corrosive deposits from forming upon the unbronzed nail shafts. A final coating of wax further inhibits moistureo—and hence corrosion—to prolong a highly polished appearance.

Some artists may desire to apply artificial patinas, to give the surface of the sheath 26 an aged or antiqued appearance.

It should be noted that other core materials may be used, such as various rigid plastic foams, which are extremely easy to shape using manual carving or heated wire methods. Foam cores, however, do not withstand heat of the level generated by the welding environment. Accordingly, a suitable covering would have to be applied over the foam core to inhibit heat transfer long enough to permit the application of the metal sheath. Plaster or a concrete mixture are examples of surface materials that can be applied for this purpose. It is also true that other metals covering the core are possible such as copper or stainless steel, and these may take the form of small or large plates, shaped beforehand or directly upon the core material. The use of copper, stainless steel or other metal coverings over the sculpted core may require the use of welding techniques consistent with the metalurgy of the selected metal covering. Oxygen/Acetylene/gas fluxing may not always be the optimum welding method. For example; Metal Inert Gas (MIG) electric welding or Tungsten Inert Gas (TIG) electric welding methods may be more suitable. The welding methods mentioned are offered as examples and not limitations in the welding or bonding methods selected by the artist or fabricator. If a material such as foam is removed, it can be easily destroyed with a very low heat source such as, for example, a propane torch. Or, it can be removed manually or with air-forced abrasives to provide typical examples of other expedients that can be used toward this end.

Following the steps such as outlined above, creates a hollow metallic sulpture of a highly distinctive appearance. The aesthetic value of the completed sculpture is enhanced, in most instances, by natural light emanating from within the sculpture. Following the described method, an almost infinite variety of sculpted shapes is within the reach of the artist, and most importantly, in the completed sculpture an appearance results which cannot be duplicated with any degree of exactness by conventional sculpting methods heretofore known.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. The method of making a metallic sculpture that comprises the steps of:
   (a) sculpting a core to an artistic shape from a substance having two main characteristics the first of which is that its surface is initially solid and firm, the second being that the substance is changeable from a solid to a fluid;
   (b) applying a quantity of headed, pin-like elements to the surface of the core, in an array wherein each head presents a flattened surface outwardly from the core surface, and spaces occur between at least some of the heads of the elements;
   (c) brazing a metallic material to the surfaces of the heads to form a hollow, metallic sheath about the core generally duplicative of the artistic shape to which the core is formed, which sheath includes the heads of the pin-like elements; and thereafter
   (d) removing the core from within the sheath by changing the form of the core from its solid to its fluid state to leave the sheath as the finished sculpture.

2. The sculpting method of claim 1 that further includes applying said metallic material to the heads of said elements and within said spaces to produce by said application a sheet-like form comprising said sheath.

3. The sculpting method of claim 1 that includes leaving some of said spaces devoid of said metallic material to provide apertures occurring freely throughout the sheath.

4. The sculpting method of claim 1 that further includes providing said sheath by applying said metallic material to the heads of said elements in a flattened form in which the heads and said material form a sheet-like covering that at least partially closes the spaces between the heads of said elements while maintaining the material in substantially the same spaced relation to the surface of the core as the heads of said elements.

5. The sculpting method of claim 3 that includes leaving apertures of irregular form and size at discrete intervals over substantially the full area of said sheath.

6. The sculpting method of claim 1 wherein the step of removing the core includes permanently destroying the core.

7. The sculpting method of claim 6 that includes using wood as the material of the core.

8. The sculpting method of claim 7 that includes burning the core to remove the core from the sheath.

9. The sculpting method of claim 1 that includes using nails having plate-like heads as the pin-like elements.

10. The sculpting method of claim 9 that includes spacing some of the heads of the nails from each other so that openings occur in said array.

11. The sculpting method of claim 10 that includes applying said elements to the core in positions in which the remaining heads are overlapped.

12. The method of making a metallic sculpture that comprises the steps of:
   (a) sculpting a core to an artistic shape from a substance having two main characteristics the first of which is that its surface is initially solid and firm, the second being that the substance is changeable from a solid to a fluid;
   (b) applying a quantity of headed, pin-like elements to the surface of the core, in an array wherein each head presents a flattened surface outwardly from the core surface, and spaces occur between at least some of the heads of the elements;
   (c) brazing a metallic material to the surfaces of the heads to form a hollow, metallic sheath about the core generally duplicative of the artistic shape to which the core is formed, which sheath includes the heads of the pin-like elements; and thereafter
   (d) removing the core from within the sheath by changing the form of the core from its solid to its fluid state to leave the sheath as the finished sculpture, the steps of applying said elements, and forming said sheath, being carried out alternately until all of said elements are applied and said sheath has been fully formed.

13. The method of claim 3 that includes using a combustible material as the core.

14. The method of claim 3 that includes using a meltable material as the core.

15. The method of claim 13 that includes forming said apertures of a size and total number such as will retard free combustion of the core and will cause the same to burn at a selected slow, controlled rate.

16. The method of making a metallic sculpture that comprises the steps of:
   (a) sculpting a core to an artistic shape from a solid capable of being changed to a fluid form;
   (b) applying support elements to the core in its solid state outwardly therefrom, at selected, spaced locations occurring with a frequency sufficient to cause said elements to define a sheath support structure generally similar in shape to said core;
   (c) applying a metallic material in molten form to said elements to form a sheet-like sheath about the core which will include both said metallic material and said elements, and will be of a shape generally duplicating that of the core; and
   (d) thereafter changing the form of the core from its solid to its fluid state so as to remove the core and leave said sheath as a finished metallic sculpture comprised wholly of said metallic material and said support elements.

17. A sculpting method as in claim 16 that further comprises applying said metallic material first to a selected area of the support structure and thereafter to other areas thereof one after another, until said sheath is completely formed.

18. A sculpting method as in claim 16 that further comprises applying said elements and said metallic material alternately until all of said elements are applied and said sheath has been fully formed.

* * * * *